Nov. 23, 1937.  W. A. REICHEL  2,099,705
DIRECTIONAL GYROSCOPIC INDICATOR
Filed May 5, 1934
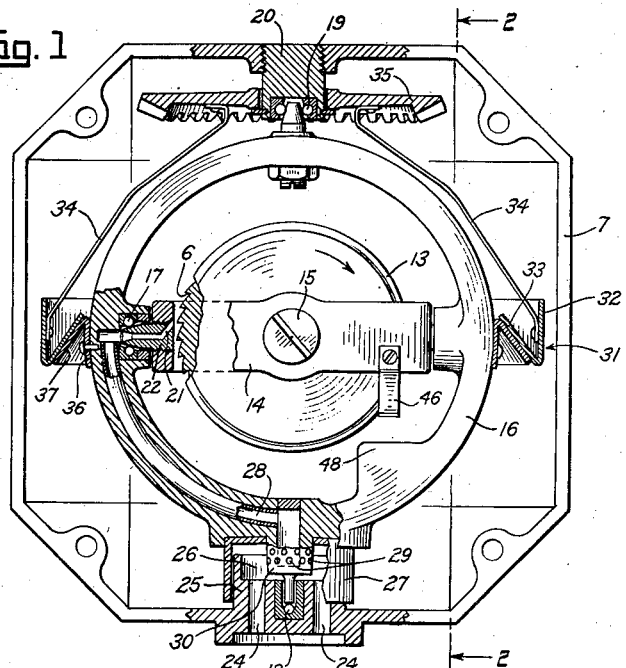
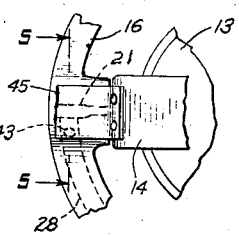
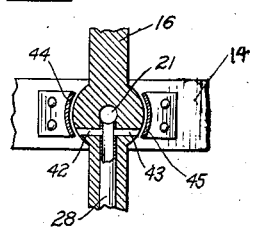
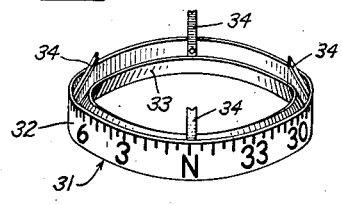
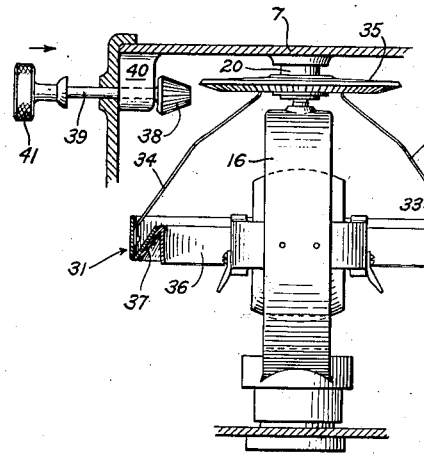
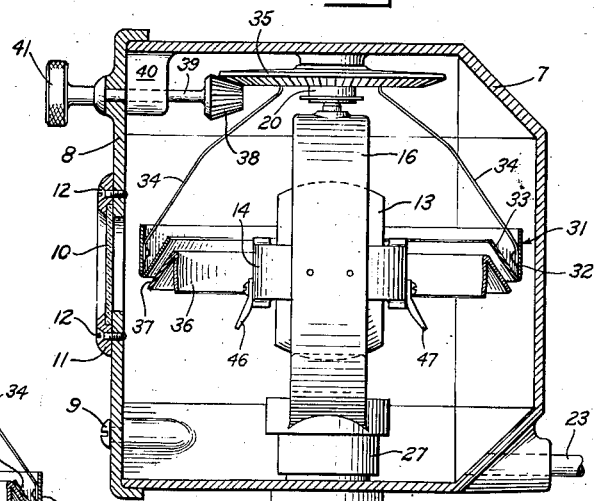
INVENTOR.
Wladimir A. Reichel
BY
Stephen Gerstvik
ATTORNEY.

Patented Nov. 23, 1937

2,099,705

UNITED STATES PATENT OFFICE 2,099,705

DIRECTIONAL GYROSCOPIC INDICATOR

Wladimir A. Reichel, Philadelphia, Pa., assignor to Bendix Aviation Corporation, South Bend, Ind., a corporation of Delaware Application May 5, 1934, Serial No. 724,183

4 Claims. (Cl. 33—204)

The present invention relates broadly to gyroscopic instruments and, more particularly, to gyroscopic directional indicators adapted for use on aircraft, although they may be used on marine vessels as well.

Heretofore, in a gyroscopic instrument of the above type, generally known as a directional gyro, in which the gyroscope is mounted for three degrees of freedom and rotated about a horizontal axis so as to maintain its position on the craft, and therefore, to act as a course indicator, it was necessary to reset the gyroscope per se, i. e., its axis in azimuth, about every fifteen minutes or so due to the fact that the gyroscope was subject to wandering or creeping off from its set position. In other words, in such devices, in order to obtain correct indications from the indicating card thereof, it was necessary to always maintain the axis of the gyroscope in a predetermined position with respect to the craft on which it was mounted. The reason for this was the fact that the indicating card of the instrument was permanently mounted on and secured to the frame of the gyroscope. It was also necessary to centralize the gyroscope at intervals, this being generally accomplished simultaneously with the resetting operation.

In accordance with the present invention, however, there is provided a novel structure in a directional gyroscope whereby the position of the axis of the gyroscope at the time of setting the course is immaterial and, therefore, it is unnecessary to cause the axis of the gyroscope to assume a predetermined position, in azimuth, with respect to the craft and whereby the gyroscope is automatically centralized, i. e., the axis of the gyroscope is maintained in azimuth at all times. This is accomplished, in accordance with the present invention, by providing an indicating card which is separate from but adapted to be connected to the gyroscope so that during the setting operation only the indicating card is set without moving the axis of the gyroscope, and by providing an automatically operated centralizing means so that if, at any time, the axis of the gyroscope moves out of the horizontal plane, it is automatically precessed back into it. After the indicating card is set, then it is connected to the gyroscope and thereafter the latter, together with the card, functions in the usual manner as a directional gyro indicator. Therefore, with such a novel structure it is immaterial what the azimuth position of the gyro axis is with respect to the craft so long as it remains in the azimuth plane. The centralizing means may be constituted by part of the driving means of the gyroscope, or may be separate therefrom as will appear more fully hereinafter.

Accordingly, one of the objects of the present invention is to provide a novel structure in a directional gyroscope whereby a course may be set without disturbing the gyroscope and whereby the axis of the latter is always maintained horizontal, i. e., in the azimuth plane.

Another object is to provide in a directional gyroscopic indicator, a novel combination which includes an azimuth direction-keeping gyroscope, an indicating card detachably carried by said gyroscope, and means whereby the card may be adjusted independently of the gyroscope to set a predetermined course.

Still another object is to provide a novel combination which includes, in addition to the foregoing, means for automatically maintaining the gyro axis in the azimuth plane and effective, as soon as said axis moves out of the azimuth plane, to move it into said plane.

The above and other objects and advantages of the invention will appear more fully hereinafter from a consideration of the detailed description which follows, together with the accompanying drawing wherein two embodiments of the invention are illustrated. It is to be expressly understood, however, that the drawing is for the purpose of illustration and description only and is not intended as a definition of the limits of the invention, reference being had to the appended claims for this purpose.

In the drawing wherein like reference characters refer to like parts throughout the several views:

Fig. 1 is a front elevation, partly in section, of one form of an instrument embodying the present invention with the front cover removed, showing the combined driving and centralizing means of the gyroscope;

Fig. 2 is a vertical section taken on line 2—2 of Fig. 1, showing the means for setting the indicating card and the latter detached from the gyroscope;

Fig. 3 is a partial view, partly in section, showing the indicating card carried by the gyroscope after the former has been set for a predetermined course;

Fig. 4 is a partial detailed view of another form of centralizing means which is operated separately from the driving means of the gyroscope;

Fig. 5 is a sectional detailed view taken on line 5—5 of Fig. 4; and

Fig. 6 is a detailed perspective view of the indicating card.

Referring now to the drawing and more particularly to Figs. 1 and 2, there is shown one form of an instrument embodying the present invention and, as illustrated, comprises an airtight casing 7 of some suitable material such as cast aluminum or a phenolic condensation product. The casing 7 is provided with a removable front cover 8 which may be secured thereto in any suitable manner, as by means of a plurality of screws, one of which is shown at 9. Centrally of the cover 8 there is located a window through which the indications of the instrument may be viewed, as will appear later, and is constituted by a transparent member or cover-glass 10 held in position by a frame 11 which is secured to the cover 8 as by means of screws 12. The azimuth or three-degrees-of-freedom gyroscope is mounted within the casing and, as shown, comprises a rotor 13 journaled in a horizontal gimbal ring 14 for rotation about a horizontal axis 15. The ring 14 is, in turn, journaled in a vertical ring 16 in any suitable manner as by means of ball bearings 17. The ring 16 is arranged for rotation about a vertical axis and, for this purpose, is journaled at the bottom by means of a thrust bearing 18 and at the top by means of ball bearings 19, the latter being carried by a threaded adjustable member 20 screwed in from the top of the casing 7.

The rotor 13 may be driven in any suitable manner but, in the present embodiment, is shown as being air-driven for which purpose said rotor 13 is provided with a plurality of turbine buckets 6 on the periphery thereof and against which a jet of air is adapted to impinge which issues from a nozzle 21 formed in a threaded member 22 which is secured to the horizontal gimbal ring 14 and which constitutes one of the pivots of said ring 14.

To provide the necessary jet of air for driving the gyroscope, the casing 7 may be exhausted, for example, by connecting the casing to a suitable source of suction (not shown) by means of pipe 23. As the air is exhausted through pipe 23, additional air is sucked into the casing through a plurality of passages 24 provided in a cylindrical member 25 secured to or formed integral with the bottom of the casing 7. The air then passes into a chamber 26 formed by a cup-shaped member 27 carried by the vertical gimbal ring 16 and the purpose of which will appear more fully hereinafter. From the chamber 26 the air enters the passage 28 in vertical ring 16 through a plurality of apertures 29 provided in a cylindrical projection 30 of the gimbal ring at the bottom thereof. After entering the passage 28, the air is directed to the nozzle 21 from which it issues and impinges against the turbine buckets 6 to drive the rotor 13. On being discharged from the turbine buckets 6, the air is then exhausted from the casing through pipe 23, as pointed out hereinbefore. Thus, by gyroscopic action, as is well known in the art, the axis 15 of the rotor 13 will keep its position in azimuth so that when the casing 7 is mounted on the panel of an aircraft and the latter deviates, relative angular movement about a vertical axis will take place between the vertical ring 16 and the casing 7. An indicating card 31 is provided for the vertical ring 16 for indicating this relative movement and, hence, the deviation of the craft from its course. The indicating card is in the form of an annular member 32 provided with an inwardly and upwardly extending annular flange 33 and, in accordance with the present invention, instead of being permanently carried by and secured to the vertical ring 16, said card is carried by a plurality of circumferentially spaced arms 34 which extend upwardly from the card and are secured to a rotatable member 35 which, in the present instance, is in the form of a bevel gear journaled on the member 20 and capable of an upward and downward sliding movement on said member longitudinally thereof so that the indicating card 31 may be moved upward and downward with respect to the vertical ring 16 and may be rotated about the vertical axis of said ring 16 independently thereof. The indicating card 31 is adapted, however, when in its downward position, to rest on an annular member 36 secured to the vertical ring 16 and provided with an outwardly and downwardly extending flange 37 which cooperates with the flange 33 of the annular member 32 of the card so as to provide a support for said card. The cooperating surfaces of the flanges 33 and 37 are preferably roughened in order to provide frictional engagement therebetween so that when the indicating card 31 is resting on the flange 36 it will rotate with the vertical ring 16 about the vertical axis to indicate the relative movement between the ring and the casing 7 and, hence, to indicate the deviation of the craft. Thus it will be seen that the indicating card is separate from the vertical ring 16 but is adapted to be carried by means of the annular member 36 and when so carried is rotatable with the ring 16 but may be rotated independently of said ring when lifted from the annular member 36. The indicating card may be provided with compass graduations as on a magnetic compass card or with arbitrary graduations on each side of zero, the zero mark indicating when the craft on which the instrument is carried is on the course and any deviation to the left or right of the zero mark will indicate a corresponding deviation of the craft.

Means are now provided for setting the indicating card 31 to indicate a predetermined course as indicated by and determined from a magnetic compass carried by the craft. In the form shown (Fig. 2) said means comprise a bevel pinion 38 secured to or formed integral with a shaft 39 journaled in a boss 40 of the casing and extending through the cover 8. The shaft 39 is capable of longitudinal movement in the boss 40 in order that the pinion 38 may be engaged with or disengaged from the bevel gear 35 and, for this purpose, the outer end of the shaft 39 is provided with a knurled knob 41. Thus, when it is desired to set the indicating card 31 for a predetermined course, the knob 41 is pushed inwardly, as shown in Fig. 2, whereby the pinion 38 is caused to engage the bevel gear 35 but due to the taper of the bevel pinion 38 the bevel gear 35 is caused to be raised so that as the pinion slides into engagement therewith, consequently, the indicating card will be lifted from the annular member 36 and, hence, will be detached from the gyroscope. While the card is detached from the gyroscope, it is caused to rotate about the vertical axis by rotating the knurled knob 41 until the desired course is indicated on the card 31 through the window 10. After the card is thus set, the knob 41 is pulled outward whereby the bevel pinion 38 is disengaged from the bevel gear 35 and the latter drops down by gravity until the flange 33 of the indicating card rests on the flange 37 of the annular member 36 in frictional engagement therewith. In this set position the indicating card is a part of the directional gyroscope and operates in the usual manner to indicate any deviation of the craft from the set course.

It is desirable to always maintain the axis of the gyroscope in the horizontal or azimuth plane and, for this purpose, means are provided for automatically moving said axis into said horizontal plane in the event that it is moved out of it. Two embodiments of such means are shown in Figs. 1 and 2 and in Figs. 4 and 5, respectively.

As illustrated in Figs. 1 and 2, said centralizing means are constituted by the nozzle 21 which, in order to carry into effect this embodiment of the invention, is located centrally of the member 22 and is so positioned that when the plane of the ring 14 is perpendicular to the plane of the ring 16, said nozzle is exactly in the latter plane, i. e., in the plane of the vertical ring 16. Thus it will be seen that when there is no relative movement between ring 14 and ring 16 about bearings 17, the jet of air issuing from the nozzle 21 will be in the plane of the ring 16, or if it be diverted at all it will be diverted equally on both sides of the plane of the ring, thereby producing either no reaction on the ring 16 or producing equal and opposite reactions thereon so that the ring remains stationary. If, however, the ring 14 tilts, with the front end of axis 15 moving downward as viewed in Fig. 1, then the air jet will issue from nozzle 21 at an angle in a direction away from the plane of the ring 16 (the plane of the paper in Fig. 1) i. e., toward the observer, and will produce a reaction on ring 16 so that the latter will rotate about its vertical axis with the left end of the ring moving in (away from the observer) and the right end moving out of the plane of the paper (toward the observer), this rotation being clock-wise when viewed from the top of Fig. 1. If the rotor 13 is spinning in the direction of the arrow, then the movement of ring 16 in the direction stated will cause the axis of the rotor to precess with the front end moving upward until the plane of the ring 14 is again perpendicular to the plane of ring 16 and the nozzle is in the latter plane. The axis of the gyroscope will, therefore, be returned to the horizontal or azimuth plane.

In the embodiment illustrated in Figs. 4 and 5, the centralizing means are separate from the driving air jet and, as shown, said means are constituted by a pair of apertures 42 and 43 (Fig. 5) disposed oppositely to each other at the left end of ring 16 and which communicate with passage 28. These apertures 42 and 43 are normally closed by arcuate vanes 44 and 45, respectively, said vanes being secured to ring 14 so that if the latter tilts clock-wise, as viewed in Fig. 5, the aperture 42 will be uncovered, and if counterclockwise, then aperture 43 will be uncovered, thus causing jets of air to issue therefrom to produce a reaction on ring 16 in one direction or another about its vertical axis and, hence, causing the gyro-axis to precess back into the azimuth plane.

In order to minimize the friction on vertical ring 16 in its rotation, said ring is mounted at its lower end on an air cushion provided by the air which enters chamber 26. This will be apparent from Fig. 1 where it is seen that as the air rushes in through passages 24, chamber 26 acts as a reservoir for the air before it enters the aperture 29 and the force of the inrush of air tends to lift the cup-shaped member 27 and, hence, ring 16 so that the weight of the latter is sustained partially by the thrust bearing 18 but to a greater extent by the air within the chamber 26. Thus, the friction at the bottom bearing 18 is materially reduced and, hence, precession of the gyroscope, due to such friction, is substantially eliminated.

Stops 46 and 47 are also provided on either side of the horizontal ring 14 at the bottom thereof, which cooperate with a projection 48 formed on the vertical ring 16 to prevent the gyroscope rotor 13 and said horizontal ring 14 from being reversed.

There is thus provided a novel structure in a directional gyroscope whereby the indicating card thereof may be set for a predetermined course independently of the gyroscope because the card is detached therefrom during setting but is secured thereto after the setting is made. By virtue of the novel structure, the angular position of the gyro axis in azimuth is immaterial so long as it is in the azimuth plane, and said axis does not have to be moved for the purpose of setting. Means are also provided for precessing the gyro axis into the azimuth plane in the event that it departs therefrom. Further, means are provided for forming a supporting air cushion for the vertical ring of the gyroscope whereby the precession of the latter due to friction is substantially eliminated and, hence, the gyro axis will keep its position for a longer time than is possible with directional gyros of the prior art.

Although only two embodiments of the invention have been illustrated and described, various changes and modifications in the form and relative arrangement of the parts, which will now be apparent to those skilled in the art, may be made without departing from the scope of the invention. Reference is, therefore, to be had to the appended claims for a definition of the limits of the invention.

What is claimed is:

1. In a gyroscopic indicator, a neutrally-mounted azimuth direction-keeping gyroscope, an annular indicating card mounted on and controlled by said gyroscope, and means for adjusting said card independently of said gyroscope to set a predetermined course.

2. In a directional gyroscope, a gimbal ring mounted for rotation about a vertical axis, a second gimbal ring mounted in said vertical ring for pivotal movement about a horizontal axis, a rotor mounted in said second ring for rotation about a horizontal axis perpendicular to said first horizontal axis, a horizontal annular supporting member carried by said vertical ring and movable therewith about the axis thereof, an indicating card in the form of an annular ring and adapted to be seated on said annular supporting member, a gear mounted for rotation about the axis of said vertical ring and for movement longitudinally of said axis, means supporting said card from said gear whereby upon longitudinal movement of said gear upward said card is lifted from said supporting member and upon longitudinal movement of said gear downward said card is seated on said member, and means for moving said gear upwardly to lift said card and for rotating said gear while said card is so raised whereby a course is set on said card without moving the gyroscope, said means being also effective to cause said card to be seated on said annular supporting member carried by the vertical ring whereby said card is thereafter controlled by said gyroscope to indicate deviation from the set course.

3. In a directional gyroscope, a gimbal ring mounted for rotation about a vertical axis, a second gimbal ring mounted in said vertical ring for pivotal movement about a horizontal axis, a rotor mounted in said second ring for rotation about a horizontal axis perpendicular to said first horizontal axis, a horizontal annular supporting member carried by said vertical ring and movable therewith about the axis thereof, an indicating card in the form of an annular ring and adapted to be seated on said annular supporting member, a gear mounted for rotation about the axis of said vertical ring and for movement longitudinally of said axis, means supporting said card from said gear whereby upon longitudinal movement of said gear upward said card is lifted from said supporting member and upon longitudinal movement of said gear downward said card is seated on said member, means for moving said gear upwardly to lift said card and for rotating said gear while said card is so raised whereby a course is set on said card without moving the gyroscope, said means being also effective to cause said card to be seated on said annular supporting member carried by the vertical ring whereby said card is thereafter controlled by said gyroscope to indicate deviation from the set course, and means for maintaining the axis of the gyro rotor and the horizontal gimbal ring in a plane perpendicular to the plane of the vertical ring.

4. In a directional gyroscopic indicator including a casing adapted for mounting on an instrument panel of an aircraft and having a window at the front thereof for viewing an indicating card therein, a directional gyroscope comprising a vertical ring in said casing and journaled for relative rotation about a vertical axis, a horizontal ring pivoted in said vertical ring for relative angular movement about a horizontal axis perpendicular to said vertical axis, a gyro rotor journaled in said horizontal ring for rotation about a second horizontal axis mutually perpendicular to said first horizontal axis and to said vertical axis, said second axis being substantially in the same horizontal plane with said first axis, said gyro rotor and said horizontal ring being substantially balanced and having substantially little or no pendulosity, whereby the spin axis of said rotor remains substantially fixed in the azimuth plane upon relative angular movement between the vertical ring and the casing about the vertical axis, except for relatively slight precession due to friction in the bearings of said rotor, an annular indicating card positioned in said casing so that a portion thereof is visible through the window, said card being detachably connected to the vertical ring and adapted for relative angular movement therewith about the vertical axis when connected thereto, and independently thereof when disconnected therefrom, and means for disconnecting said card from said vertical ring and for rotating it about the vertical axis independently of the gyroscope into a position to indicate a predetermined direction which it is to maintain in azimuth under the direct control of the gyroscope after it is connected thereto.

WLADIMIR A. REICHEL.